Dec. 7, 1965   R. D. SIMONTON   3,221,403
APPARATUS AND METHOD FOR PRODUCING CLOSURES
IN BATTERY CONTAINERS
Filed Oct. 9, 1962   2 Sheets-Sheet 1

INVENTOR.
ROBERT D. SIMONTON
BY
ATTORNEY

Dec. 7, 1965  R. D. SIMONTON  3,221,403
APPARATUS AND METHOD FOR PRODUCING CLOSURES
IN BATTERY CONTAINERS
Filed Oct. 9, 1962  2 Sheets-Sheet 2
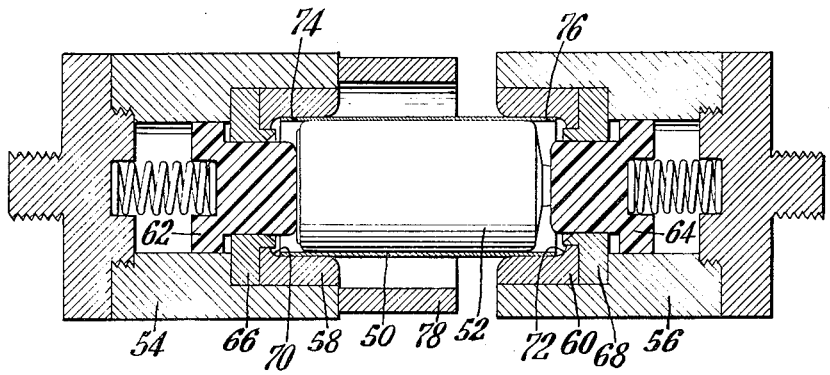
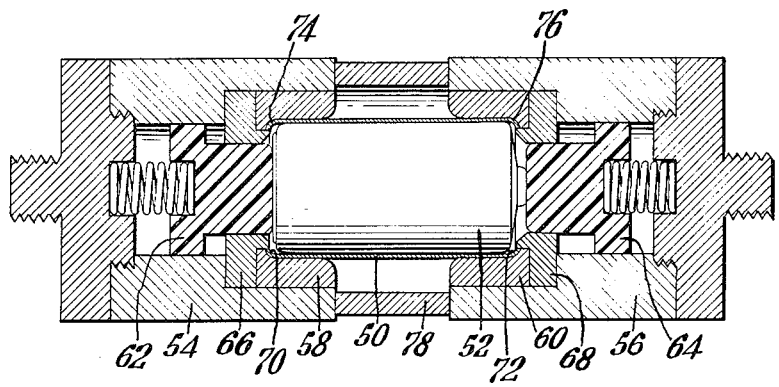
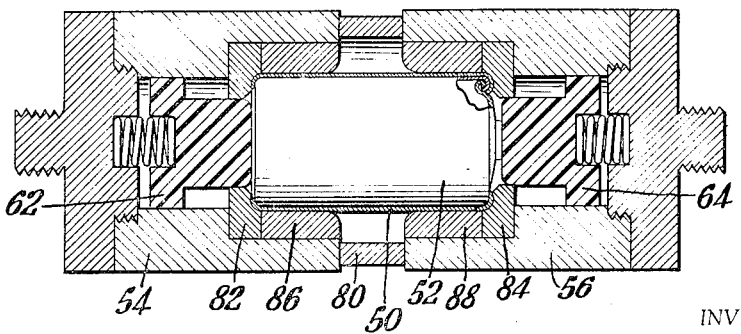
INVENTOR.
ROBERT D. SIMONTON
BY
ATTORNEY

United States Patent Office 3,221,403
Patented Dec. 7, 1965

3,221,403
APPARATUS AND METHOD FOR PRODUCING CLOSURES IN BATTERY CONTAINERS
Robert D. Simonton, Bay Village, Ohio, assignor to Union Carbide Corporation, a corporation of New York
Filed Oct. 9, 1962, Ser. No. 229,314
4 Claims. (Cl. 29—511)

This invention relates to closures for battery containers and has as its principal object to provide an apparatus and method for producing closures at both ends of a battery container without the necessity for external bracing or clamping of the container during assembly.

Another object of the invention is to provide means for the simultaneous forming of the ends of the battery container to a desirable curl such as from about 90° to 180° or therebetween whichever may be suitable for a particular application.

The above and other objects are achieved by an apparatus embodying the invention which comprises a pair of spaced spring loaded outer rings having internally formed surfaces adapted to hold and initially curl the ends of the battery container. Within and adjacent the outer rings are a pair of concentric inner rings having peripheral steps provided for stopping the pre-curling of the ends of the container when the outer rings are axially moved toward each other. Disposed within the inner rings and axially movable therewith are a pair of spring-loaded pressure pads which hold the cells, terminal covers and spring, etc. together under compression and in alignment to insure good electrical contact after assembly. When the outer rings axially converge toward each other, the internally formed surfaces meter and initially curl the ends of the container to the peripheral steps of the inner rings, which rings then force the ends of the container to curl over the peripheral edge portions of the cells. It will become apparent that a container closure for either a single cell or a multi-cell battery stack can be produced by the apparatus of the invention.

The invention will be more clearly understood by reference to the drawings, which depicts an apparatus embodying the invention, and in which.

Figure 1:
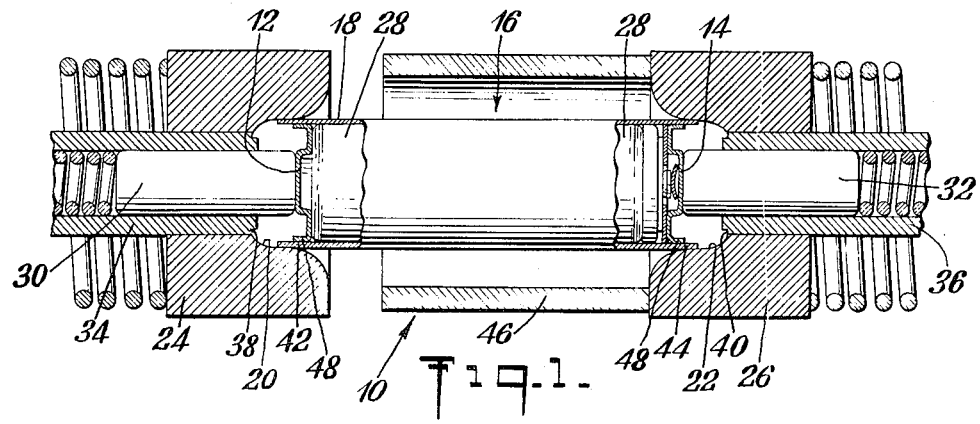
FIGURE 1 is a side elevational view, partially in section, showing the initial sequence of simultaneously curling the ends of a battery container.
Figure 2:
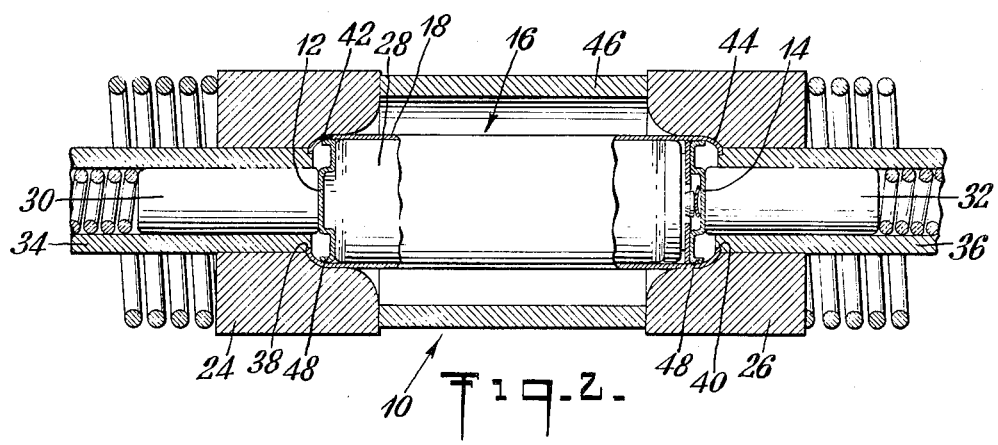
FIGURE 2 is a side elevational view, partially in section, of the apparatus of FIG. 1, but illustrating an intermediate step in the operation of the apparatus.
Figure 3:
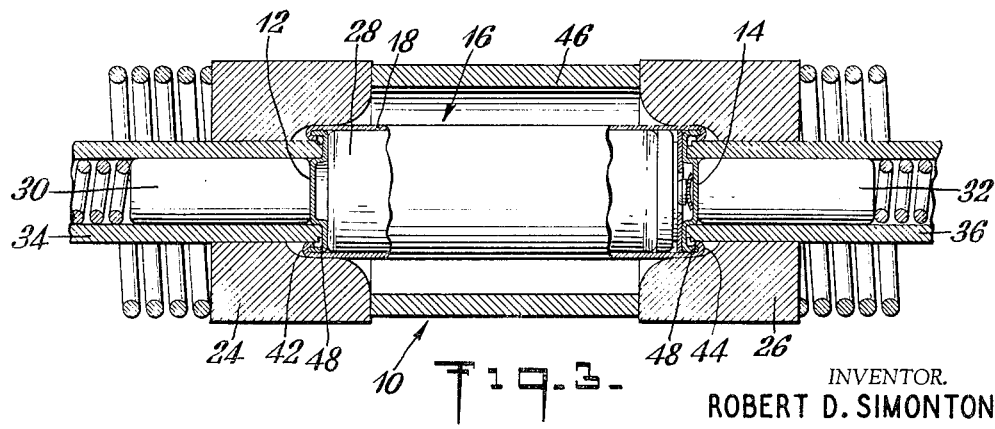

FIGURE 3 is a side elevational view, partially in section, of the apparatus of FIGURES 1 and 2 showing the completed curl, prior to withdrawal of the finished battery from the apparatus; and FIGURES 4, 5 and 6 are side elevational views, partially in section, of a modification of the apparatus of FIGURES 1, 2 and 3 suitable for use in curling the ends of a jacket enclosing a single cell.

Referring now to the drawing, and more particularly to FIGURES 1, 2 and 3, there is shown an apparatus 10 for securing a pair of end terminal covers 12 and 14 of a battery 16 to a battery container 18, suitably made of metal or the like. If necessary, the inside wall of the container 18 may be lined with an insulator. FIGURE 1 illustrates the first step of apparatus when it is in operation. The battery 16 as there shown is disposed between and supported by two internally formed surfaces 20 and 22 of a pair of oppositely and axially mounted spring loaded outer rings 24 and 26.

The cells 28 and end terminal covers 12 and 14 of the battery 16 are held in place under compression by a pair of spring loaded non-conductive pressure pads 30 and 32. A pair of inner rings 34 and 36 disposed within the outer rings 24 and 26 are provided with peripheral edge portions 38 and 40 which provide a stop for the initial curling of the ends 42 and 44 of the container 18 as best shown in FIGURE 2. A spacer ring 46 limits the axial movement of the outer rings 24 and 26 and is also illustrated in FIGURE 2.

In the operation of the apparatus 10, the particular stack of cells 28 to be assembled into the battery container 18 is inserted between the spring loaded nonconductive pads 30 and 32. The internally formed surfaces 20 and 22 of the outer rings 24 and 26 align the battery container 18 in the apparatus 10 by supporting the ends 42 and 44 circumferentially, and is best shown in FIGURE 1. When the outer rings 24 and 26 are pushed axially towards each other by a suitable press (not shown), the internally formed surfaces 20 and 22 pre-curl and meter the ends 42 and 44 inwardly so that the ends 42 and 44 are rolled over without wrinkling to the peripheral edge portions 38 and 40 of the inner rings 34 and 36 as shown in FIGURE 2.

The movement of the outer rings 24 and 26 is stopped by the spacer ring 46. The ends 42 and 44 are pre-curled approximately 90° by the outer rings 24 and 26. Subsequently, the inner rings 34 and 36 are pushed axially towards each other a controlled amount, so that the ends 42 and 44 are caused to roll-over and be curled around the upturned peripheral portion 48 of each end terminal cover 12 and 14 as shown in FIGURE 3. This additional curling forms an approximate U or 180° curl on both ends 42 and 44 of the battery container 18 simultaneously. The curl is tight and of a small radius since it is curled around the thin upturned peripheral flange portion 48 of each end terminal cover. The major bending stresses are absorbed by the internally formed surfaces 20 and 22 of the outer rings 24 and 26. Hence, the compressive stress on the contents of the battery or the container 18 are minimized and thus no significant stress is transmitted outwardly against the unsupported wall portion of the container 18. Of course, if it is desired the container may be supported.

In FIGURES 4, 5 and 6 a modification of the apparatus just described is shown. Within a battery container 50 illustrated, is suitably a cell 52 which is to be assembled and finished by providing it with a desired battery container 52. FIGURES 4 and 5 illustrate the first work station which performs the exact metering and pre-curling step, and FIGURE 6 shows the final work station which performs the roll-over step.

The container 50 is shown disposed between and supported by two outer rings 54 and 56 having detachably mounted internally formed surfaces 58 and 60. The cell 52 is held in position under compression by a pair of spring-loaded nonconductive pads 62 and 64. A pair of inner rings 66 and 68 disposed within the outer rings 54 and 56 are provided with peripheral edge portions 70 and 72 which provide a stop for the initial curling of the ends 74 and 76 of the container 50, and is best shown in FIGURE 5. A spacer ring 78 limits this partial curling thus relieving the stresses exerted on the container 50 subsequent to the pre-curling step.

FIG. 6 is very similar to FIGURES 4 and 5 except that the apparatus illustrated there is provided with a shorter limit stop or spacer ring 80. The apparatus is also provided with a different set of inner rings 82 and 84 than those shown in FIGURES 4 and 5, in addition to straight sided annular rings 86 and 88, rather than the internally formed surfaces 58 and 60 of the first work station. If desired, the spacer rings 78 and 80 can be eliminated by using a positive stroke press when moving the outer rings.

The performance of this modified version is similar to the operation of the apparatus shown in FIGURES 1, 2, and 3.

In the operation of the apparatus of FIGURES 4, 5 and 6, the precedure is to interpose between the non-conductive pressure pads 62 and 64 the particular container 50 and the corresponding cell 52 to be assembled and finished. The internally formed surfaces 58 and 60 disposed within the outer rings 54 and 56 align and provide the circumferential supporting means to the ends 74 and 76 and is best shown in FIGURE 4. When the outer rings 54 and 56 are pushed axially towards each other by a suitable press (not shown), the internally formed surfaces 58 and 60 precurl and meter the ends 74 and 76 inwardly, so that the ends 74 and 76 are rolled over without wrinkling to the peripheral edge portions 70 and 72 of the inner rings 66 and 68, as shown in FIGURE 5. This method of precurling the ends 74 and 76 is a precise metering procedure in which the exact end portion of the jacket required for the curl is provided with a partial curl.

The ends 74 and 76 strike the peripheral edge portions 70 and 72 of the inner rings 66 and 68 at the same instant the outer rings 54 and 56 abut against the spacer ring 78, as in FIGURE 5. Thus, the precurl and metering step is completed and now the axial compression exerted on the jacket during the precurling operation predominately bears upon the spacer ring 78. It is preferable when using this modified apparatus to perform the final or roll-over step by using the inner rings 82 and 84 of FIGURE 6. The inner rings 82 and 84 form relatively tight curls of a larger radius and are preferable when a large open curl is desired or when a curl is to be made over a cell already fitted with a curled over lining. The spacer ring 80 is used to stop the final curl formed by the inner rings 82 and 84 when they are pushed towards each other a predetermined amount.

An important advantage of the apparatus of the invention is that a controlled curl can be produced at both ends of a battery container simultaneously. In addition, faster production rates are encountered since the axial forces transmitted to the battery container are small thus eliminating the need for external clamping or bracing to support the container during the curling operation. Furthermore, the apparatus of the invention is particularly desirable where the container is very thin in thickness and the contents of the jacket cannot withstand any radial clamping pressure. It is also easy to eject the finished battery from the apparatus by just separating and spreading apart the outer rings. The finished battery drops away from the outer rings while at the same time another battery assembly is being received between the pressure pads of the apparatus.

It will be appreciated that the invention can be applied to battery containers of a seamed, seamless or other type construction conventionally used in the art. If desired, the apparatus described herein can be used to apply a curl on only one end of a container.

What is claimed is:

1. An apparatus for producing closures at both ends of a battery container, comprising a pair of oppositely disposed and axially movable spaced annular rings, said annular rings having internally formed surfaces adapted to hold, initially curl and meter the ends of said container concentric inner rings adjacently disposed within said annular rings, said inner rings having peripheral step portions, axially movable nonconductive pads positioned within said inner rings, and means for stopping the axial movement of said annular rings; said annular rings adapted to axially converge toward each other whereby the contour of said formed surfaces precurl and meter the ends of said container to said peripheral step portions of said inner rings, said inner rings adapted to curl over the ends of said container, and said pads resiliently maintaining the contents of said container under compression and in alignment.

2. An apparatus for producing closures at both ends of a battery comprising a cylindrical container and end terminal closure members having peripheral edge portions, comprising a pair of oppositely disposed and axially movable spaced hollow outer rings, said outer rings being resiliently mounted and having internally formed surfaces adapted to hold, initially curl and meter the ends of said container, axially movable concentric and tubular shaped inner rings adjacently disposed within said outer rings, said inner rings having external peripheral edge portions, axially movable non-conductive pads positioned within said inner rings, and means for stopping the axial movement of said outer rings; said outer rings adapted to axially converge toward each other whereby the contour of said formed surfaces precurl and meter the ends of said container to said outer peripheral edge portions of said inner rings, said inner rings adapted to axially converge simultaneously a predetermined amount so the ends of said container curl over the peripheral edge portions of said end terminal closure members, and said pads resiliently maintaining said end terminal closure members and the contents of said container under compression and in alignment.

3. An apparatus for producing closures at both ends of a battery comprising a cylindrical container and at least one galvanic cell therein, comprising a pair of oppositely disposed and axially movable spaced hollow outer rings, said outer rings having detachably mounted internally formed surfaces which are adapted to hold, initially curl and meter the ends of said container, interchangeable concentric inner rings detachably mounted to said outer rings and adjacent said formed surfaces, said inner rings having inner peripheral step portions, axially movable nonconductive pads situated within said inner rings, and means for stopping the axial movement of said outer rings; said outer rings adapted to axially converge toward each other whereby the contour of said formed surfaces precurl and meter the ends of said container to said inner peripheral step portions of said inner rings, said interchangeable inner rings adapted to roll over the ends of said container about the rim of said cell, and said pads resiliently maintaining the contents of said container under compression and in alignment.

4. A method of assembling a battery comprising at least one galvanic cell and a cylindrical container therefor; said method comprising supporting said container peripherally about each end, compressing the ends of said container longitudinally and radially such that said ends are simultaneously metered inwardly toward the axis of said container and into a predetermined curl, thereby forming a tight radius of said ends about the peripheral edges of said cell and providing good electrical contact between the components of said battery assembly.

References Cited by the Examiner
UNITED STATES PATENTS

| | | | |
|---|---|---|---|
| 174,821 | 3/1876 | Johnson | 29—511 |
| 1,597,889 | 8/1926 | Hulbert | 29—511 |
| 2,331,449 | 10/1943 | Wittenberg | 29—511 |
| 2,462,928 | 3/1949 | Young | 113—18 |
| 2,555,700 | 6/1951 | O'Neil | 153—48 |
| 2,822,774 | 2/1958 | Stearns | 113—18 |
| 2,937,222 | 5/1960 | Kempf | 136—175 |
| 3,057,949 | 10/1962 | Prell | 136—175 |

CHARLES W. LANHAM, *Primary Examiner.*